United States Patent
Servin et al.

(10) Patent No.: US 10,411,565 B2
(45) Date of Patent: Sep. 10, 2019

(54) BRUSH HOLDER ASSEMBLY FOR AN ELECTRIC MOTOR

(71) Applicant: Valeo Systèmes d'Essuyage, Le Mesnil Saint Denis (FR)

(72) Inventors: Alain Servin, Villiers (FR); Christophe Faucher, Chatellerault (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 301 days.

(21) Appl. No.: 15/381,870

(22) Filed: Dec. 16, 2016

(65) Prior Publication Data

US 2017/0179793 A1    Jun. 22, 2017

(30) Foreign Application Priority Data

Dec. 17, 2015  (FR) ...................... 15 62685

(51) Int. Cl.
*H02K 11/026* (2016.01)
*H02K 5/14* (2006.01)
*H01R 39/38* (2006.01)
*H02K 13/00* (2006.01)

(52) U.S. Cl.
CPC ......... *H02K 11/026* (2013.01); *H01R 39/385* (2013.01); *H02K 5/148* (2013.01); *H02K 13/00* (2013.01); *H02K 13/006* (2013.01)

(58) Field of Classification Search
CPC ...... H02K 11/026; H02K 5/148; H02K 13/00; H02K 13/006
See application file for complete search history.

(56) References Cited

U.S. PATENT DOCUMENTS

| | | | | |
|---|---|---|---|---|
| 5,221,130 A | * | 6/1993 | Satoh | H01F 27/29 310/239 |
| 6,555,943 B2 | * | 4/2003 | Walther | H02K 5/148 310/239 |
| 7,291,957 B2 | * | 11/2007 | Simofi-Ilyes | H01R 39/381 310/239 |

(Continued)

FOREIGN PATENT DOCUMENTS

| CN | 201222593 Y | 4/2009 |
|---|---|---|
| CN | 202889053 U | 4/2013 |

(Continued)

OTHER PUBLICATIONS

Preliminary Report Issued in Corresponding French Application No. 1562685, dated: Sep. 8, 2016 (9 Pages).

(Continued)

*Primary Examiner* — Emily P Pham
(74) *Attorney, Agent, or Firm* — Osha Liang LLP

(57) ABSTRACT

The present invention relates to a brush holder assembly (100) for an electric motor (1) of a motor vehicle equipment item comprising:
a plate (9) intended to hold at least one connection brush (7) against a collector (6) arranged on a rotor (6) of en electric motor (1), the plate (9) extending in a plane perpendicular to said rotor (6),
at least one induction coil (19) intended to be connected to said connection brush (7), the brush holder assembly (100) also comprising at least one retaining element (27) of the at least one induction coil (18) configured to hold the induction coil (19) in a plane parallel to the plate (9).

12 Claims, 3 Drawing Sheets

(56) References Cited

U.S. PATENT DOCUMENTS

2009/0315420 A1* 12/2009 Hurst .................... B60S 1/08
                                                  310/72
2015/0084479 A1*  3/2015 Schoele ................ H02K 5/148
                                                 310/239

FOREIGN PATENT DOCUMENTS

| DE | 9316543 U1      | 9/1994  |
|----|-----------------|---------|
| DE | 19623258 A1     | 12/1997 |
| DE | 102007005572 A1 | 8/2008  |
| DE | 102009027366 A1 | 1/2011  |
| EP | 0612137 A1      | 8/1994  |
| FR | 2520153 A1      | 7/1983  |
| FR | 2972863 A1      | 9/2012  |
| KR | 20150024182 A   | 3/2015  |
| WO | 9748170 A1      | 12/1997 |
| WO | 2011000618 A1   | 1/2011  |

OTHER PUBLICATIONS

First Office Action in corresponding Chinese Application No. 201611174580.1, dated Aug. 15, 2018 (14 pages).

* cited by examiner

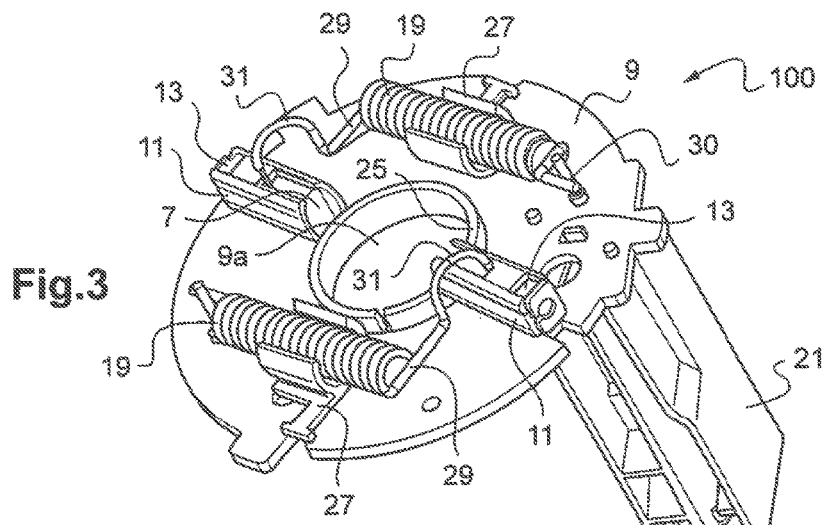
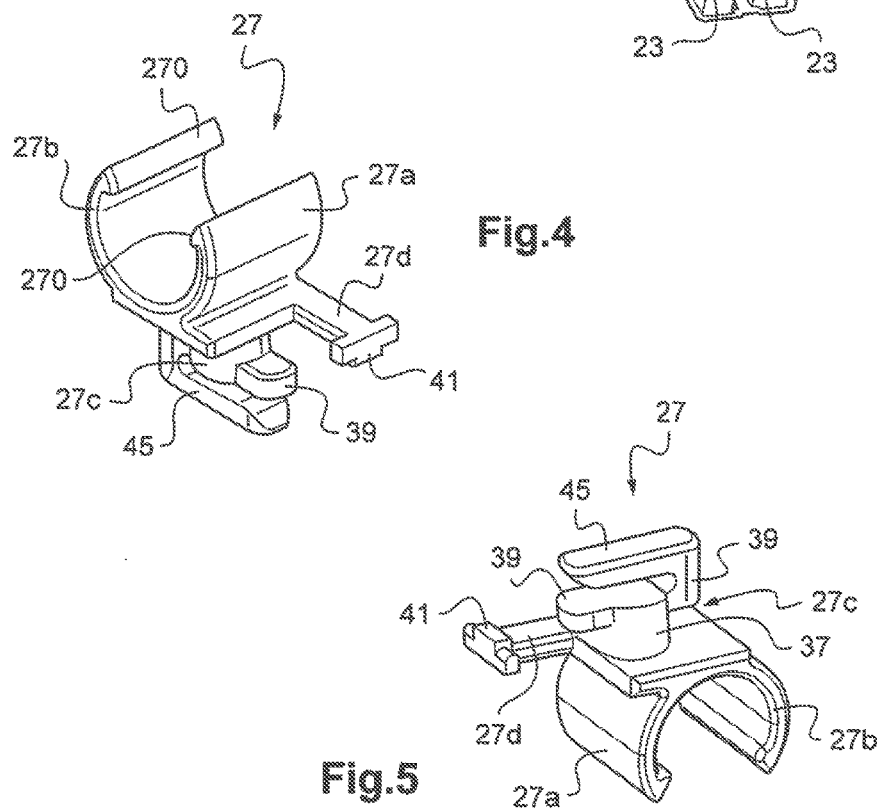

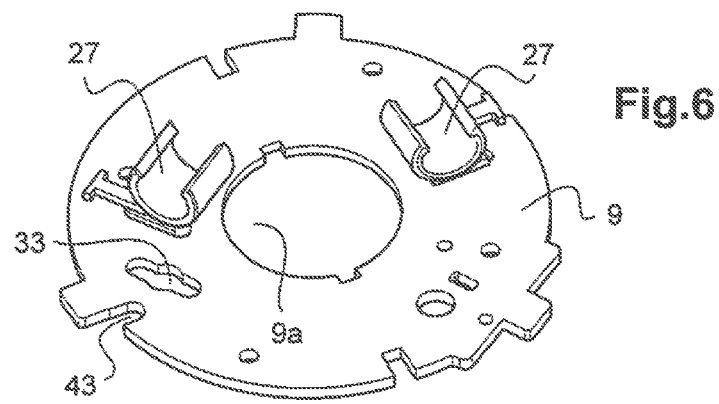
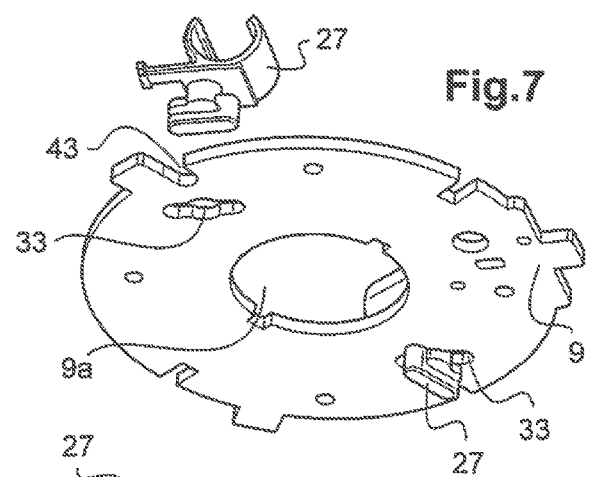
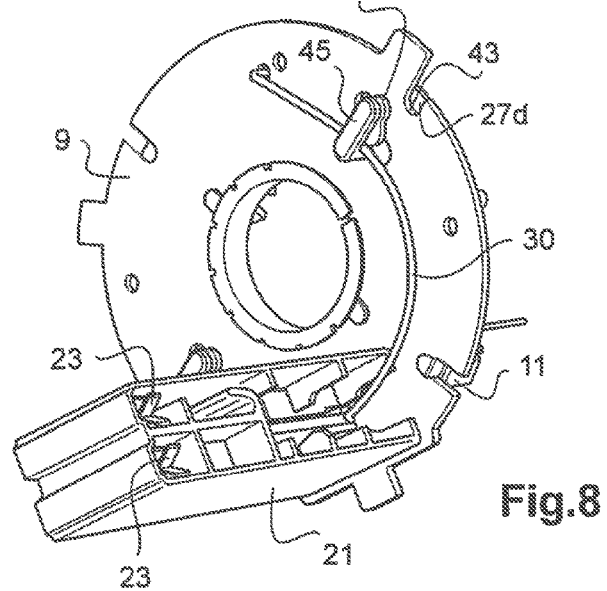

BRUSH HOLDER ASSEMBLY FOR AN ELECTRIC MOTOR

The present invention relates to the field of motor vehicle equipment items comprising an electric motor, and more precisely the brush holder assemblies of these equipment items, such as windscreen wiper motors for example.

FIG. 1 represents a diagram of en electric motor 1 according to the prior art. The electric motor 1 comprises a rotor 6 on which is arranged an armature 3 equipped with a cylindrical collector 5 against which connection brushes 7 rub to supply the armature 3. In addition, the electric motor 1 comprises a plate 9 equipped with brush holders 11 intended to receive the connection brushes 7 and springs 13 to ensure the contact between the connection brush 7 and the collector 5. The elements of the electric motor 1 previously described and the inductor arranged about the armature 3 are housed in a protective casing 15 of the electric motor 1. The casing 15 is closed by a cover 17 on one of its ends, said cover 17 serving as a bearing for the electric motor 1.

Furthermore, the electric motors with connection brushes 7 and collector 5 cause electromagnetic interference in wide frequency bands. This interference can disrupt the electronic equipment located nearby. They can, for example, cause the accidental operation of an actuator controlled by an electronic system.

To solve these problems, it is known to use a filter to reduce or eliminate the harmful effects of interference. The filters notably include induction coils that are connected to brushes to limit the high parasitic frequencies.

The documents DE19623258, DE9316543, FR2520153, DE102007005572, DE102009027366 and EP0812137 are known in this field.

Furthermore, due to space limitations within the electric motor 1, induction coils 19 are generally placed in an electrical connection column 21 secured to the brush holder plate 9 and extending perpendicularly to the plate 9 as shown in FIG. 2, which represents a brush holder assembly according to the prior art. The electrical connection column 21 also comprises connection terminals 23 to supply the connection brushes 7. However, with such an arrangement, there are risks of electromagnetic interaction between the inductor of the electric motor 1 and the induction coils 19, which can undermine the efficiency of the filter established by the induction coils 19 and the electromagnetic compatibility of the electric motor 1.

A solution must therefore be found to secure the induction coils 19 dose to the connection brushes 7 while minimising the electromagnetic interactions between the induction coils 19 and the inductor of the electric motor 1. Furthermore, in order to facilitate the mounting of the electric motor 1, a means must be found to easily secure the induction coils 19 in order to facilitate their installation and their connection to the brushes 7.

For this purpose, the present invention relates to a brush holder assembly for an electric motor of a motor vehicle equipment item comprising:
- a plate intended to hold at least one connection brush against a collector arranged on a rotor of the electric motor, the plate extending in a plane perpendicular to said rotor,
- at least one induction coil intended to be connected to said connection brush, wherein the brush holder assembly comprises at least one retaining element of the at least one induction coil configured to hold the induction coil in a plane parallel to the plate.

The use of an induction coil retaining element makes it possible to facilitate the installation of the electric motor, notably in making the electrical connections with the induction coil Furthermore, holding the induction coil in a plane parallel to the plate, i.e. in a plane perpendicular to the axis of the rotor and therefore perpendicular to the field lines of the magnetic field created by the electromagnetic components of the motor, notably the inductor, thereby makes it possible to reduce the electromagnetic interactions between the induction coil and the other elements of the electric motor. This makes it possible to reduce the electromagnetic interference created by the electric motor and which can disturb the other electronic devices located near the electric motor.

According to another aspect of the present invention, the retaining element is removably fastened to the plate.

The use of a removable retaining element offers a high degree of modularity by being able to adapt different types of retaining elements, corresponding to, for example, different types of induction coils on the same plate model.

According to an additional aspect of the present invention, the retaining element comprises resilient arms for retaining the induction coil.

According to an additional aspect of the present invention, the resilient arms form a induction coil retaining clip.

The use of a retaining clip allows the induction coil to be easily installed and reliably held in place.

According to another aspect of the present invention, the retaining element comprises a mounting base that snap-fastens onto the plate.

According to another aspect of the present invention, the retaining dement comprises a quarter-turn type mounting base for installation on the plate.

The quarter-turn mount design offers simple and fast installation.

According to an additional aspect of the present invention, the mounting base has a generally T-shaped design enabling it to be inserted into a complementary slot in the plate and to be pivoted to block translational movement of the retaining element in relation to the plate, the retaining element further comprising an elastically deformable arm provided with a stop pin intended to be inserted in a complementary shape in the plate to block the rotation of the retaining element in relation to the plate.

According to another aspect of the present invention, the retaining element comprises a hook located on the part of the mounting base intended to be inserted into the complementary slot of the plate, said hook serving as a wire guide for a power cable of the induction coil.

According to another aspect of the present invention, the plate has the general shape of a disc, perforated in the centre to allow the collector to pass through.

According to an additional aspect of the present invention, the plate is made of bakelite.

According to another aspect of the present invention, the retaining element is made of polyamide, e.g. a PA 6.6 type polyamide resin loaded with 35% glass fibre.

According to another aspect of the present invention, the assembly also comprises at least one electrical connection column intended to be secured on the plate and extending in a direction perpendicular to the plane of the plate, said electrical connection column comprising at least one connection terminal intended to be connected to the induction coil.

The present invention also relates to an electric motor of a motor vehicle equipment item, including a wiper system, comprising a collector and a brush holder assembly as described above.

Other characteristics and advantages of the invention will become apparent from the following description, given by way of example and without restrictions, with reference to the accompanying drawings in which:

FIG. 3 represents a diagram of a brush holder plate and an electrical connection column according to the present invention;

FIGS. 4 and 5 represent a diagram of a retaining element according to an embodiment of the present invention;

FIGS. 6 and 7 represent a diagram of an assembly comprising a plate and retaining elements;

FIG. 8 represents a diagram of a brush holder plate and an electrical connection column according to the present invention.

In all the figures, the elements having identical functions bear the same reference numbers.

Figure 1:
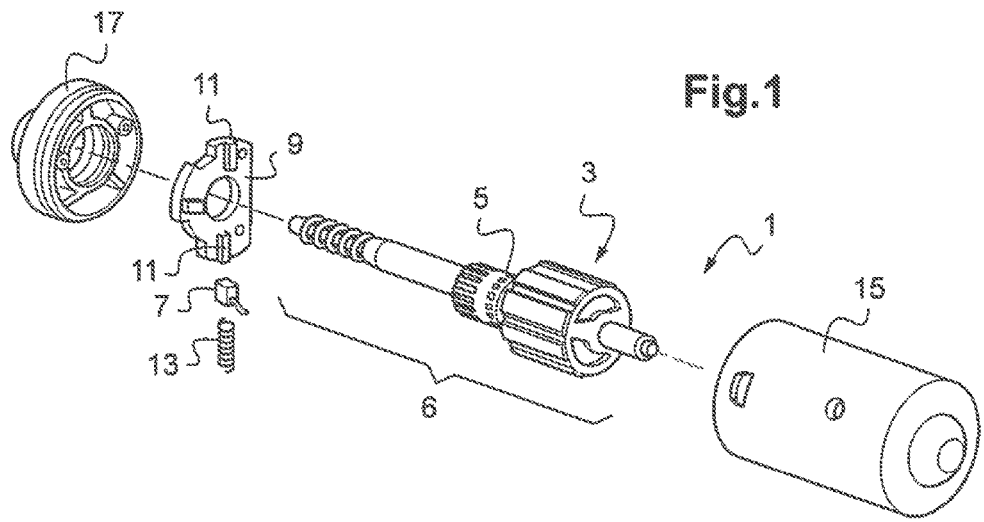
FIG. 1 represents a schematic exploded view of an electric motor.
Figure 2:
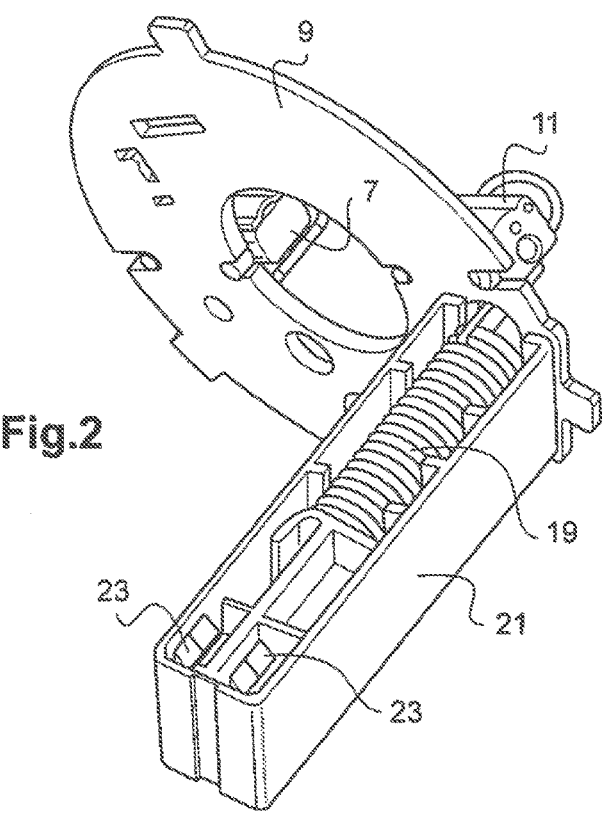
FIG. 2 represents a diagram of a brush holder plate and an electrical connection column according to the prior art.

The following embodiments are examples. Although the description refers to one or several embodiments, this does not necessarily mean that every reference concerns the same embodiment, or that the characteristics apply only to a single embodiment. Elementary characteristics of different embodiments may also be combined or interchanged to provide other embodiments.

FIG. 3 represents a brush holder assembly 100 for an electric motor 1 of an motor vehicle equipment item, notably a windscreen wiper device comprising a gear motor. The assembly 100 comprises a plate 9 for holding at least one connection brush 7 about and against a collector 5 of the electric motor 1. To do this, the plate 9 has a general disc shape, for example, that is open in the centre to allow the collector 5 to pass through. The open central portion 9a may have a circular shape adapted to receive a cylindrical collector 5. The collector 5 is associated with a rotor 5 of the electric motor 1. The plate 9 can be made of bakelite, which helps it withstand high temperatures, for example in the order of 150° C. Owing to the electrical components 3 of the motor, the temperature at the level of the plate 9 can reach a temperature near 150° C.

The assembly 100 also comprises at least one brush holder 11, two in the case of FIG. 3, intended to be secured to the plate 9 and to receive a connection brush 7. The brush holders 11 can be secured to the plate 9 by means of a retaining ring 25 located at the level of the open central portion 9a of the plate 9 or by snap-fastening onto the plate 9 or by any other means of attachment known to those skilled in the art. Alternately, the brush holder 11 can be formed integrally with the plate 9.

The connection brushes 7 are positioned in a housing of the brush holder 11 wherein they are movable in translation, the translation movement being directed towards the centre of the plate 9. Furthermore, the brush holders 11 comprise a resilient element 13, such as a leaf spring, a spiral spring or a coil spring, for example, configured to constrain the connection brush 7 toward the centre of the plate 9. Thus, in the mounted state, the plate 9 surrounds the collector 6 and the connection brushes 7 are held in contact with tracks of the collector 5 by the action of the brush holder 11 and the resilient element 13.

The assembly 100 also comprises at least one induction coil 19, two in this case, intended to be connected to a connection brush 7. Each induction coil 19 is held on the plate 9 by at least one associated retaining element 27. The retaining elements 27 are detachably secured to the plate 9 and are configured to hold the associated induction coil 19 in a plane parallel to the plate 9. The induction coils 19 are electrically connected to the connection brushes 7, for example via connecting cables 29 connecting a first end of the induction coils 19 to an electrical power supply wire 31 of the brushes, also referred to as "shunts". The assembly 100 may also include an electrical connection column 21, which has a general parallelepiped shape for example, whose length extends in a direction perpendicular to the plane of the plate 9. The electrical connection column 21 comprises means for fastening to the plate 9, snap-fastening means for example, at a first end and at least one connection terminal 23, two in this case, at a second end opposite the first. The electrical connection column 21 is made in the shape of a shell, for example, that can be opened on certain sides and configured to receive power cables 30 connecting the connection terminals 23 to the induction coils 19. The electrical connection column 21 can also receive electrical components intended to be connected between the connection terminals 23 and the induction coils 19, such as capacitors configured to be coupled to the induction coils 19 to form LC type filters. The size and the shape of the electrical connection column 21 may vary depending on the model of electric motor 1 and depending on the components intended to be positioned in the connection tower 21.

The retaining elements 27 will be described in detail from FIGS. 4 to 7,

FIGS. 4 and 5 represent two different views of a retaining element 27 intended to be secured to the plate 9 and to hold an induction coil 19. The retaining element 27 comprises of the resilient retaining arms 27a and 27b of the induction coil. The resilient arms 27a and 27b are shown here facing one another and curved inward to form a retaining clip for the induction coil 19 in the shape of a cradle, although other configurations having a number, an arrangement and/or arms of different shape are also possible within the scope of the present invention. The resilient arms 27a and 27b may also comprise a retaining hook 270 at their ends for a better hold on the induction coil 19.

The retaining element 27 also comprises a mounting base 27c, which can be seen better in FIG. 5, to allow the retaining element 27 to be secured to the plate 9.

According to an embodiment shown in FIGS. 4 to 7, the retaining element 27 on the plate 9 is secured by a quarter-turn fastener.

To do this, the mounting base 27c has a general T-shape and is intended to be inserted into a complementary slot 33 on the plate 9, visible in FIGS. 6 and 7. The T-shape is formed by a central cylindrical column 37 topped, at its end, by two lateral lugs 39 arranged on either side of the cylindrical central column 37. The complementary slot 33 has an elongated shape which allows the top of the base 27c to pass through it when the lateral lugs 39 are aligned with the longitudinal axis of the complementary slot 33. When the top of the mounting base 27c is introduced into the complementary dot 33, the retaining element 27 can be pivoted, a quarter turn for example, in order to prevent the retaining element 27 from moving in translation in relation to the plate 9. Different angles, other than 90, may also be chosen to secure the retaining element 27.

The retaining element 27 further comprising an elastically deformable arm 27d equipped with a stop pin 41 intended to be inserted into a complementary shape 43 of the plate 9 to prevent the retaining element 27 from rotating in relation to the plate 9 when the angle of 90° is reached. Here, the complementary shape 43 is positioned on an edge of the plate 9 and the arm 27d is rectilinear, but other shapes of arm 27d and of complementary shape 43, as well as other locations for the complementary shape 43, may also be chosen within the scope of the present invention.

During assembly of the electric motor 1 one thus simply inserts the end of the base 27c, opposite the resilient arms 27a and 27b, into the complementary slot 33 of the plate and turns the retaining element 27 one quarter turn to secure said retaining dement 27 to the plate 9. The induction coil 19 can then be placed on the retaining element 27 between the resilient arms 27a and 27b.

According to en alternative embodiment, the retaining element 27 can be attached to the plate 9 by snap-fastening.

Furthermore, the retaining element 27 comprises a hook 45 located on the part of the mounting base 27c intended to be inserted into the complementary slot 33 of the plate 9, i.e. on the part opposite the resilient arms 27e and 27b. The hook 45 is for example made in a U-shape extending from a first tab 39 and returning toward the second tab 39. The hook 45 serves as a wire guide for the power cable 30 of the induction coil 19, i.e. the power cable 30 connecting the connection terminal 23 of the electrical connection column 21 to the induction coil 19 held on the retaining element 27 as shown in FIG. 8. Once the retaining element 27 is secured to the plate 9, the power cable 30 of the induction coil 19 can thus be slipped into the hook 45 so as to be retained which prevents the power cable 30 from hanging free and from being damaged when the plate 9 is being mounted on the armature 3 of the electric motor 1.

The retaining dement 27 is, for example, made of type PA 6.6 polyamide resin loaded with 35% glass fibre or any other material enabling sufficient elasticity to be obtained at the level of the arms 27a and 27b, of the arm 27d and the hook 45 and to withstand temperatures up to 150° C.

The use of an assembly 100 comprising a plate 9 and at least one retaining element 27 thereby allows induction coils 19 to be easily secured to the plate 9 and in a plane parallel to the plate 9 which limits the electromagnetic interactions between the induction coils 19 and the other elements of the electric motor 1, notably the inductor as the induction coils 19 are thus positioned perpendicularly to the lines of the magnetic field of the inductor. This improves the electromagnetic compatibility the electric motor 1. Furthermore, securing by a quarter turn device enables the retaining element 27 to be easy mounted on the plate end provides modularity that allows different types of induction cons 19 to be secured to the same plate model 9. The use of resilient arms 27a and 27b forming a retaining clip enables the induction coils 19 to be easily installed and securely held on the plate 9. Finally, the use of a hook 45 allows the power cable 30 of the connection bush 7 to be held in place and further facilitates the installation of the electric motor 1 while avoiding damage to the power cable 30.

The invention claimed is:

1. A brush holder assembly for an electric motor of a motor vehicle equipment item, comprising:
   a plate for holding at least one connection brush against a collector arranged on a rotor of the electric motor, the plate extending in a plane perpendicular to said rotor; and
   at least one induction coil configured to be connected to said connection brush,
   wherein the brush holder assembly comprises at least one retaining element of the at least one induction coil configured to hold the at least one induction coil in a plane parallel to the plate, and
   wherein the at least one retaining element is removably secured on the plate.

2. The brush holder assembly according to claim 1, wherein the at least one retaining element comprises resilient retaining arms of the at least one induction coil.

3. The brush holder assembly according to claim 2, wherein the resilient arms form a retaining clip of the at least one induction coil.

4. The brush holder assembly according to claim 1, wherein the retaining element comprises a mounting base that snap-fastens onto the plate.

5. The brush holder assembly according to claim 1, in which the plate has a general shape of a disc, perforated in a centre to allow the collector to pass through.

6. The assembly according to claim 1, wherein the plate is made of bakelite.

7. The brush holder assembly according to claim 1, wherein the retaining element is made of polyamide.

8. The brush holder assembly according to claim 1, further comprising at least one electrical connection column to be secured to the plate and extending in a direction perpendicular to the plane of the plate, said electrical connection column comprising at least one connection terminal intended to be connected to the at least one induction coil.

9. An electric motor of a windscreen wiper system, comprising:
   a collector; and
   the brush holder assembly according to claim 1.

10. A brush holder assembly for an electric motor of a motor vehicle equipment item, comprising:
    a plate for holding at least one connection brush against a collector arranged on a rotor of the electric motor, the plate extending in a plane perpendicular to said rotor; and
    at least one induction coil configured to be connected to said connection brush,
    wherein the brush holder assembly comprises at least one retaining element of the at least one induction coil configured to hold the at least one induction coil in a plane parallel to the plate, and
    wherein the at least one retaining element comprises a quarter-turn type mounting base for installation on the plate.

11. The brush holder assembly according to claim 10, wherein the quarter-turn type mounting base has a generally T-shaped design for insertion into a complementary slot in the plate and to be pivoted to block translational movement of the at least one retaining element in relation to the plate, the at least one retaining element further comprising an elastically deformable arm provided with a stop pin configured to be inserted in a complementary shape in the plate to block the rotation of the at least one retaining element in relation to the plate.

12. The brush holder assembly according to claim 11, wherein the at least one retaining element comprises a hook located on the part of the quarter-turn type mounting base configure to be inserted into the complementary slot of the plate, said hook serving as a wire guide for a power cable of the at least one induction coil.

* * * * *